(12) United States Patent
Ried

(45) Date of Patent: Oct. 16, 2001
(10) Patent No.: US 6,302,820 B1

(54) PLANETARY SPEED CHANGE TRANSMISSION

(75) Inventor: Klaus Ried, Tübingen (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/519,402

(22) Filed: Mar. 3, 2000

(30) Foreign Application Priority Data

Mar. 10, 1999 (DE) ............................................. 199 10 299

(51) Int. Cl.$^7$ .................................. F16H 3/62; F16H 3/44
(52) U.S. Cl. .......................................... 475/276; 475/280
(58) Field of Search .................................... 475/280, 281, 475/276, 296, 297

(56) References Cited

U.S. PATENT DOCUMENTS

| | | | |
|---|---|---|---|
| 3,946,624 | * | 3/1976 | Murakami et al. .............. 475/280 X |
| 3,971,267 | | 7/1976 | Murakami et al. . |
| 6,071,208 | * | 6/2000 | Koivunen .......................... 475/276 X |

FOREIGN PATENT DOCUMENTS

| | | | |
|---|---|---|---|
| 28 13 223 | | 9/1979 | (DE) . |
| 42 38 856 | | 5/1994 | (DE) . |
| 43 13 289 | | 10/1994 | (DE) . |
| 197 29 405 | | 1/1998 | (DE) . |
| 2272735 | * | 5/1994 | (GB) .................................... 475/276 |
| 0118241 | * | 5/1990 | (JP) ..................................... 475/276 |

* cited by examiner

Primary Examiner—Charles A. Marmor
Assistant Examiner—Roger Pang
(74) Attorney, Agent, or Firm—Klaus J. Bach

(57) ABSTRACT

In a planetary speed change transmission wherein an input shaft is drivingly connected, by way of at least one of three planetary gear structures, to an output shaft five forward gears including a direct gear are obtained with three friction clutched and three friction brake structures. In one embodiment, a sixth forward gear is obtained by providing in one of the drive connections between two of the three planetary gear structures a disengageable clutch. In another embodiment, a sixth forward gear is obtained by auxiliary planetary gears which are engaged by an auxiliary ring gear that is connected to a fourth brake structure for locking the auxiliary ring gear. With this arrangement, a seventh forward gear and a second reverse gear can be obtained.

6 Claims, 4 Drawing Sheets

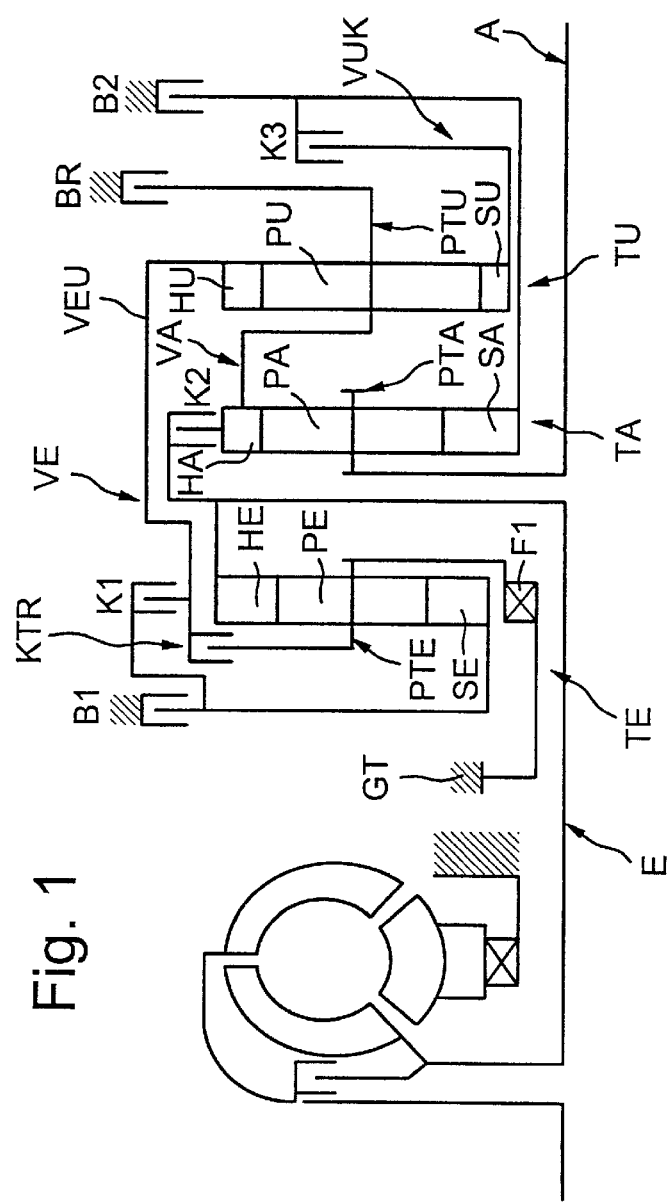

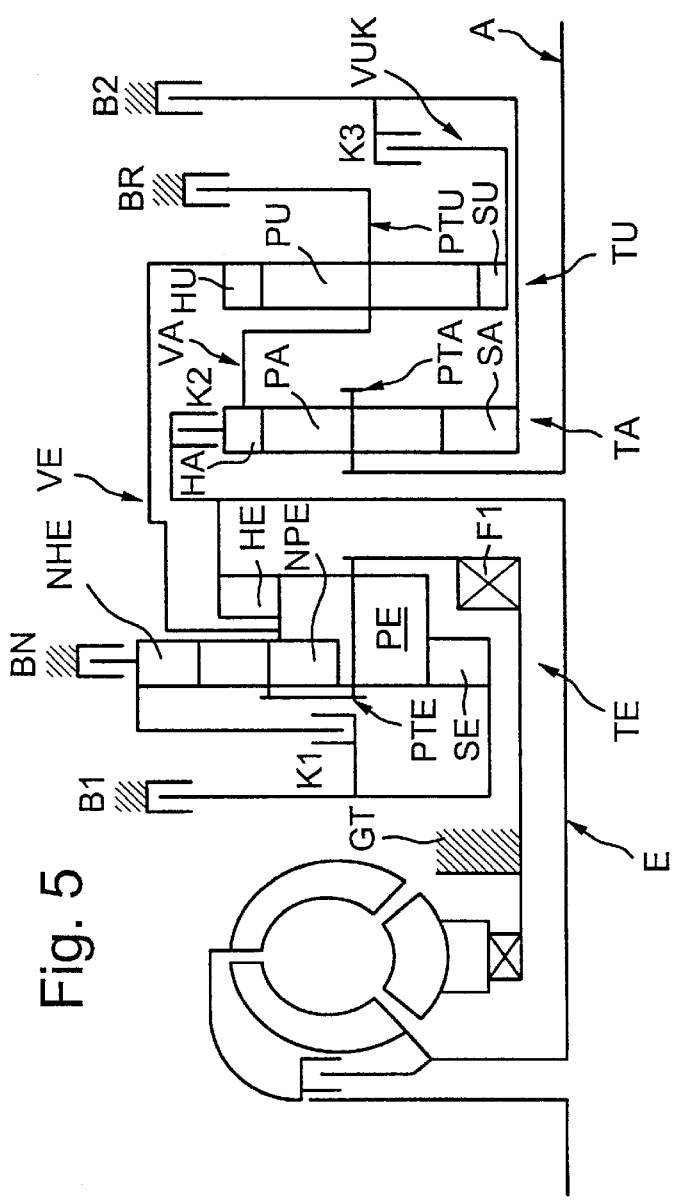

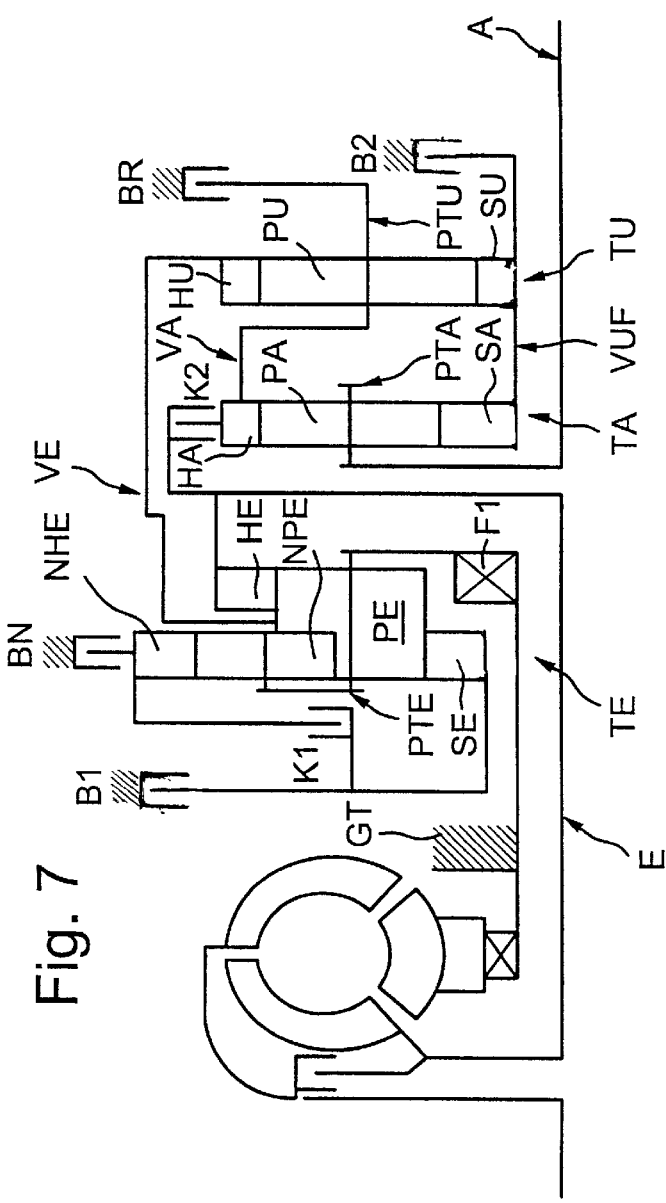

PLANETARY SPEED CHANGE TRANSMISSION

BACKGROUND OF THE INVENTION

The present invention relates to a planetary speed change transmission with an input shaft, which can be drivingly connected to an output shaft by way of at least one of three planetary gear transmission structures.

In a known planetary type speed change transmission as shown for example in DE 42 38 866 C2 five forward speed ranges including a direct motion transmitting fourth speed range are obtained utilizing six friction engagement elements (three brakes and three clutches).

It is the object of the present invention to provide a planetary-type speed change transmission with at least six forward speed ranges including an upper direct transmission speed range (direct gear), wherein only a minimum of constructive changes with respect to a conventional planetary speed change transmission of this type are required.

SUMMARY OF THE INVENTION

In a planetary speed change transmission wherein an input shaft is drivingly connected, by way of at least one of three planetary gear structures, to an output shaft, five forward gears including a direct gear are obtained with three friction clutches and three friction brake structures. In one embodiment, a sixth forward gear is obtained by providing a disengageable clutch in one of the drive connections between two of the three planetary gear structures. In another embodiment, a sixth forward gear is obtained by auxiliary planetary gears which are engaged by an auxiliary ring gear which is connected to a fourth brake structure for locking the auxiliary ring gear. With this arrangement, a seventh forward gear and a second reverse gear can be obtained.

In the arrangement according to one embodiment of the invention, the object is solved by dividing the coupling connection of the input transmission structure and employing the other two transmission structures (the output transmission structure and the reversing transmission structure) as a common coupled drive for forming at least one additional forward gear. In another embodiment (as defined in claim 3) the object is solved by using as the input transmission structure a so-called Ravigneaux transmission with an outer additional ring gear, which is in engagement with auxiliary planet gears and which is connected to a separate brake and contributes to the formation of at least one additional forward speed range.

With the planetary speed change transmission as defined in claim 1 an intermediate forward speed range can be provided in that the separation clutch and the reverse gear brake can be disengaged while, in an intermediate gear other than a direct motion transmission (third) gear, the clutch connected to the outer ring gear of the output transmission structure as well as the brake connected to the sun gear of the output transmission structure are engaged.

In another embodiment, an additional lower forward speed range—that is, a transmission with seven forward gears—can be formed by exclusively engaging the brakes connected with the auxiliary ring gear of the input transmission structure and those connected with the sun gear of the output transmission structure whereby the transmission ratio is provided by a multiplying interconnection of the individual transmission ratios of the three transmission structures—thereby providing a first (low) speed range.

With the planetary-type speed change transmission of both embodiments, two reverse speed ranges can be obtained by operating the output transmission structure and the reverse transmission structure in both reversing speed ranges as a common coupled transmission while the reversing brake is engaged and the sun gear of the input gear structure is locked in one of the reverse gear ranges with a partial transmission ratio greater than 1 or, in the other reverse gear range, the input gear structure is at a transmission ratio of 1 by engagement of the brake connected to the sun gear.

In another embodiment of the planetary speed change transmission according to the invention an additional third reverse gear is obtained in that the output gear structure and reverse gear structure operate as a common coupled transmission structure when the reverse brake is engaged and the auxiliary ring gear, which is fixed by braking, is used as the reaction member for the input transmission structure.

In the planetary speed change transmissions of the type with which the present invention is concerned the drive connection between the sun gears of the output transmission structure and the reverse transmission structure is established by engaging a friction clutch connected to these transmission structures.

In the planetary gear speed change transmission of either of the embodiments, the drive connection between the sun gears of the output transmission structure and the reverse transmission structure may be permanent so that a clutch and the respective control equipment can be eliminated.

In the planetary gear speed change transmission according to the invention, the two lowermost speed ranges include a hill-holding function by providing a freewheeling clutch. The hill-holding function may also be effective in the third gear.

Various embodiments of the invention will be described below on the basis of the accompanying drawings.

BRIEF DESCRIPTION OF THE DRAWINGS

FIG. 1 shows schematically a first embodiment of a planetary speed change transmission in cross-section, FIG. 2 is a table showing, which of the shifting means (clutches/brakes) are effective with the various transmission ranges of the transmission.

FIG. 5 shows a schematically in a longitudinal cross-sectional view a third embodiment of the planetary-type speed change transmission, FIG. 6 is a table indicating, which shifting means are actuated for the various gears in accordance with the setup of FIG. 5, FIG. 7 shows schematically, in a longitudinal cross-sectional view, another embodiment of the planetary type speed change transmission, and FIG. 8 is a table indicating, which shifting means are actuated in the setup as shown in FIG. 7.

DESCRIPTION OF PREFERRED EMBODIMENTS

Figures 3, 4:
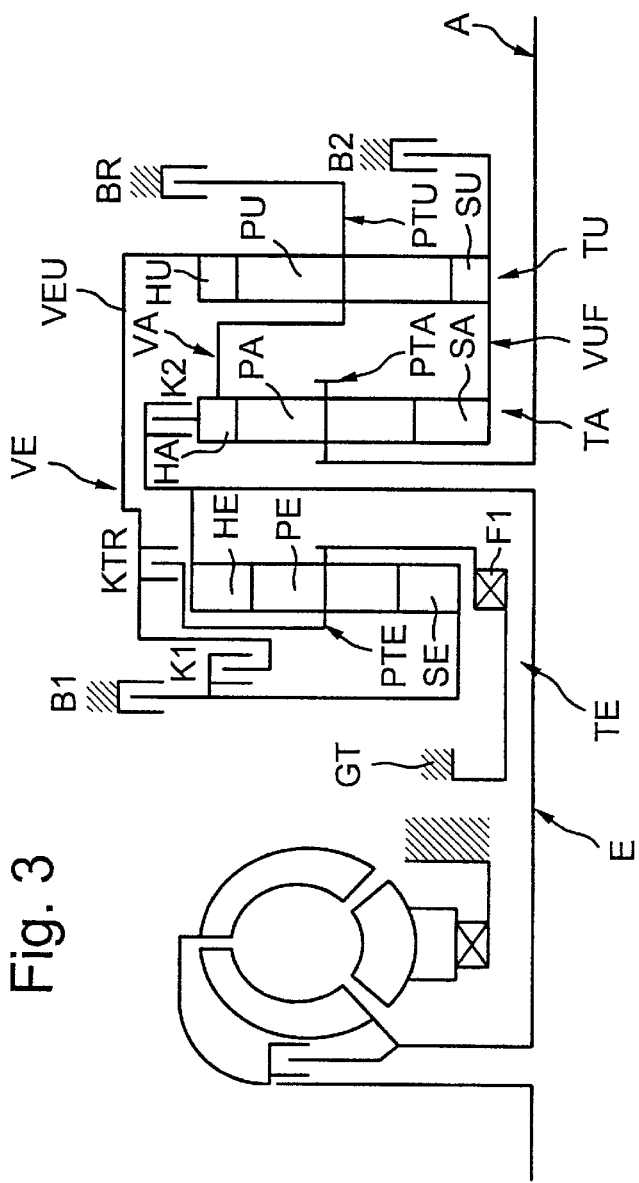
FIG. 3 shows schematically a second embodiment of a planetary type speed change transmission in a longitudinal cross-sectional view.
FIG. 4 is a table indicating, which shifting means are activated for the various gears of the transmission as shown in FIG. 3.

All the embodiments of the planetary type speed change transmission have the following features:

An input planetary transmission structure TE includes a planetary gear carrier PTE. An outer gear ring HE is engagement with the planetary gears PE and is drivingly connected to an input shaft E. An inner sun gear SE is also in engagement with the planetary gears and is connected to a engageable and disengageable friction brake B1 and a disengageable clutch K1. Between the planetary gear carrier PTE and a fixed housing part GT, there is provided a free-wheeling clutch F1, which engages when the planetary gear carrier PTE rotates in a direction opposite to that of the input shaft E, but permits rotation in the same direction.

An output planetary gear transmission structure TA includes a planetary gear carrier PTA on which the planetary gears PA are rotatably supported and which includes a drive connection to an output shaft A. A ring gear HA is disposed around, and in engagement with, the planetary gears PA and is connected to the input shaft E by way of an engageable and disengageable friction clutch K2. The planetary gears PA are further in engagement with a sun gear SA, which is connected to an engageable and disengageable brake B2.

A planetary gear reversing structure TU includes a planetary gear carrier PTU on which planetary gears PU are rotatably supported and which is connected to an engageable and disengageable friction brake BR and further is drivingly connected with the ring gear HA of the output planetary gear structure TA. A sun gear HU is in engagement with the planetary gears PU and has a drive connection VE to the planetary gear carrier PTE of the input transmission gear structure TE. The planetary gears PU are in engagement with a sun gear SU.

The two embodiments of FIGS. 1 and 5 have in common that a drive connection VUK is provided between the two sun gears SA and SU which can be engaged by way of an engageable and disengageable clutch K3.

The two embodiments of FIGS. 3 and 7 have in common, that a drive connection VWF is provided between the sun gears SA and SU, which is permanent that is the two sun gears SA and SU are drivingly interconnected.

The two embodiments of FIGS. 1 and 3 have in common that the drive connection VE between the planetary gear carrier PTE and the ring gear HU is provided by way of an engageable and disengageable friction clutch KTR and the clutch K1, which is connected on one side to the sun gear SE is connected on the other side to the part VEU of the drive connection VE leading from the friction clutch KTR to the ring gear HU.

The two embodiments of FIGS. 5 and 7 have in common that on the planetary gear carrier PTE auxiliary planetary gears NPE are rotatably supported so as to be in engagement with the planetary gears PE and also with an auxiliary ring gear NHE which is connected to an engageable and disengageable friction brake BN.

TRANSMISSION STATE, FIRST GEAR (FIRST SPEED RANGE):

FIG. 1: As shown in the table of FIG. 2, the brakes B1 and B2 as well as the clutches K3 and KTR are engaged. In this state, the three transmission structures TE, TA and TU are set in a standard transmission ratio wherein the reaction member—sun gear SE or SA or SU respectively—, are locked in position and, with respect to the power flow through the transmission, disposed in series so that the transmission ratio is given by a multiplication of individual transmission ratios.

FIG. 3: The state of the transmission corresponds to that of FIG. 1 as indicated in the table FIG. 4 since the clutch KTR and the brakes B1 and B2 are engaged and also the sun gear SU is locked by way of the connection VUF with the Brake B2.

FIG. 5: Here, the state of the transmission is also such that, in accordance with the table of FIG. 6, the brake B2 and the clutch K3 are engaged, whereby the two transmission structures TA and TU are in a standard setting—with locked sun gears SA and SU serving as reaction members—and are arranged in series for the power flow through the transmission. This is also true for the input transmission structure TE, but, in this case, the standard transmission ratio is provided through the locked auxiliary ring gear NHE which provides for a greater transmission ratio than could be obtained by locking the sun gear SE. Consequently, a higher transmission ratio is obtained for the first speed range than with the embodiments of FIGS. 1 and 3.

FIG. 7: According to the table of FIG. 8, the state of the transmission corresponds to that of FIG. 5, since, also in this case, the auxiliary ring gear NHE is locked by the brake BN and the sun gears SA and SU are locked by the brake B2. The three transmission structures TE, TA and TU are arranged in the power flow in series. Accordingly, also in this case, a higher transmission ratio is obtained for the first speed range (in first gear) than with the arrangements of FIGS. 1 and 3.

STATE OF THE TRANSMISSION 2. GEAR

FIG. 1: As indicated in the table of FIG. 2, this state differs from that of the 1. gear only in that the input transmission structure TE is in a transmission ratio 1:1, whereas, for the other transmission structures TA and TU, the sun gears SA and SU remains locked so as to form reaction members. As a result, with the transmission ratio of 1:1 for the transmission structure TE, the overall transmission ratio is lower, that is the output speed is increased for the 2 gear with the multiplicative series arrangement of the three transmission structures.

FIG. 3: In accordance with the table of FIG. 4, the transmission state corresponds to that of FIG. 1 in as much as the input transmission structure TE is at a transmission ratio 1:1 in series with the two other transmission ratio 1:1 in series with the two other transmission structures TA and TU which are in the standard arrangement with locked sun gears SA and SU.

FIG. 5: In accordance with the table of FIG. 6, the transmission state corresponds to that of FIG. 1 for the first gear in as much as all three transmission structures TE, TA and TU are in their standard arrangements wherein the sun gears SE, SA and SU are all locked and act as reaction gears. Also, they are arranged in a series power flow setup so that, here too, the transmission ratio is given by multiplication of the transmission ratios of the three transmission structures.

FIG. 7: In accordance with the table 8, the transmission state corresponds again to that of FIG. 1 for the first gear in as much as all three transmission structures TE, TA and TU are in the standard arrangement with locked sun gears SE, SA and SU and are arranged in series so that the transmission ratio for the second gear is obtained by a multiplication of the transmission ratios of these three transmission structures TA TE and TU.

TRANSMISSION STATE, 3. GEAR

FIG. 1: In accordance with the table of FIG. 2, the transmission state is such that the transmission structures TE and TU do not participate in the establishment of the transmission ratio since the clutch K3 is disengaged so that the sun gear of the transmission structure TU does not act as a reaction member and the transmission structure TE is set at a transmission ratio 1:1 by the clutches K1 and KTR. As a result, the transmission ratio for the third gear is obtained solely from the transmission ratio of the output transmission structure TA with locked sun gear SA.

FIG. 3: In accordance with the table of FIG. 4, the transmission status for the third gear corresponds to that of FIG. 1 that is the speed transmission is again obtained solely from the transmission ratio of the output transmission structure TA with the locked sun gear SA serving as reaction member. Only the clutch K2 and the brake B2 are engaged and the clutch KTR is disengaged. In this third gear, the clutch K1 may additionally be engaged in order to achieve a controlled speed behavior of the transmission members PE and SE in the input transmission structure TE. However, the clutch K1 has no influence on the transmission ratio.

FIG. 5: In this embodiment, the input transmission structure TE is arranged in the power flow in series with the transmission structures TU and TA by the clutch K1 at a transmission ratio 1:1. The transmission structures TA and TU are at their standard transmission ratio with locked sun gears SA and SU respectively serving as reaction members. Consequently, the transmission ratio in this case is a product of the standard transmission ratios of the two transmission structures TA and TU.

FIG. 7: Because the clutch K1 and the brake B2 are engaged as indicated in the table of FIG. 8, the input transmission structure TE is, like in the embodiment of FIG. 5, arranged in the power flow in series with the transmission structures TU and TA. The transmission structures TU and TA are at their respective standard transmission ratio by the locking the connecting structure VUF of the sun gears SU and SA which, as a result, serve as reaction members, and are arranged in series. Again the transmission ratio is formed as the product of the standard transmission ratios of the transmission structures TA and TU.

TRANSMISSION STATE, FOURTH GEAR:

FIG. 1: Because all the clutches are engaged (K1, K2, K3, KTR) all three transmission structures TE, TA and TU are locked together so that the transmission ratio is 1:1.

FIG. 3: All the clutches K1, K2 and KTR are engaged that is all the transmission structure TE, TA and Tu are interconnected such that the transmission ratio is 1:1.

FIG. 5: In accordance with the table of FIG. 6, the clutches K1 and K2 and the brake B2 are engaged so that the transmission structures TE and TU are at a transmission ratio 1:1 and the output transmission structure is at its standard ratio wherein the sun gear is locked and serves as a reaction member. The transmission ratio therefore depends solely on the ratio of the output transmission structure TA.

FIG. 7: In accordance with the table of FIG. 8, the clutch K2 and the brake B2 are engaged. The sun gears SA and SU are coupled together so that the transmission structures TE and TU are not included in the power transmission path. The output transmission structure TA is at its standard transmission setup wherein the sun gears SA and SU which are interconnected are locked. The transmission ratio therefore depends alone on the ratio provided by the output transmission structure TA.

TRANSMISSION STATE: FIFTH GEAR:

FIG. 1: As shown in the table of FIG. 2, the clutches K2, K3 and KTR as well as the brake B1 are engaged so that all three transmission structures TE, TA, and TU are interconnected to form a coupled drive. The locked sun gear SE forms a reaction member so that the interconnected sun gears SA and SE are driven by the input shaft E at a speed greater than that of the output shaft A.

FIG. 3: In this case, there is a coupling connection VUF between the sun gears SA and SU instead of an engagement of the clutch K3. Otherwise, the same coupling arrangement for the three transmission structures TE, TA and TU is obtained as in FIG. 1, since, in accordance with the table of FIG. 4, besides the brake B1 also the clutches K2 and KTR are engaged, whereby an overdrive transmission gear is obtained just like in the embodiment of FIG. 1.

FIG. 5: As shown in the table of FIG. 6, the three clutches K1, K2 and K3 are engaged so that all three transmission structures TE, TA and TU are interconnected and rotate as a unit so that a direct drive is obtained.

FIG. 7: As indicated in the table of FIG. 8, the two clutches K1 and K3 are engaged. The function of the engaged clutch K3 of FIG. 5 is taken over by the coupling connection VUF so that, also in this case, all three transmission structures TE, TA and TU rotate as a unit and form a direct transmission gear.

TRANSMISSION STATE $6^{th}$ GEAR

FIG. 1: As shown in the table of FIG. 2, the brake B1 and the clutches K1, K2 and K3 are engaged whereby the two transmission structures TA and TU are coupled. The ring gear HU is locked and serves as a reaction element. The sun gears SA and SU are driven at higher speed with respect to the input shaft E than the output shaft A.

FIG. 3: As indicated in the table of FIG. 4, the brake Bl and the clutches K1 and K2 are engaged. As a result, with the the sun gears SA and SU being interconnected, the two transmission structures TA and TU are again combined to form a coupled drive with a locked ring gear HU serving as a reaction member. As a result, the sun gears SA and SU are speeded up with respect to the input shaft to a high degree and the speed of the output shaft A is increased with respect to that of the input shaft E to a smaller degree.

FIG. 5: As indicated in the table of FIG. 6, the brake B1 and the clutches K2 and K3 are engaged whereby all three transmission structures are interconnected to form a coupled drive. The sun gear SE is locked which provides for a relatively high increase of speed of the interconnected sun gears SA and SU and, to a lower degree, an increase of the speed of the output shaft A with respect to the input shaft E.

FIG. 7: As indicated in the table of FIG. 8, the brake Bl and the clutch K2 are engaged. The coupling connection VUF interconnects the sun gears SA and SU so that all three transmission structures TE, TA and TU are interconnected and form a coupled drive. The sun gear SE is locked and forms a reaction member. In this setup, the speed of the sun gears SA and SU is increased to a relatively large degree and to a smaller degree the speed of the output shaft A relative to the input E shaft.

TRANSMISSION STATE: $7^{th}$ GEAR:

FIG. 5: As indicated in the table of FIG. 6, the brake BN and the clutches K2 and K3 are engaged so that all three transmission structures are combined to a singled coupled drive, wherein the locked auxiliary gear ring NHE increases the speed of the drive, that is, the speed of the sun gears SA and SU at a relatively high rate and to a lesser degree the speed of the output shaft A with respect to the speed of the input shaft E.

FIG. 7: As indicated in the table of FIG. 8, the brake BN and the clutch K2 are engaged. In this case, the coupling VUF of the sun gears SA and SU assumes the function of an engagement of the clutch K3 in FIG. 5, so that also here all three transmission structures TE, TA and TU are interconnected to form a common coupled drive unit, wherein the locked auxiliary ring gear NHE forms a reaction member providing for an increased speed of the sun gears SA and SU at a relatively high rate and at a lesser rate for the output shaft A with respect to the input shaft E.

TRANSMISSION STATE REVERSE GEAR R1:

FIG. 1: As indicated in the table of FIG. 2, the brakes B1 and BR and the clutches K3 and KTR are engaged. As a result, the two transmission structures TA and TU are interconnected so as to form a coupled drive with a locked planetary gear carrier PTU. In the power path ahead of the coupled drive, the transmission structure TE is disposed in standard arrangement with locked sun gear. With the standard transmission arrangement a relatively high transmission is obtained in this speed range which provides for an opposite direction of rotation for the interconnected sun gears SA and SU because of the engagement of the reverse brake BR. As a result, the speed of the sun gears SA and SU for the output shaft A is again somewhat reduced.

FIG. 3: In this case, the coupler shaft VUF assumes again the function of the engagement state of the clutch K3 of FIG. 1, whereas, in accordance with the table of FIG. 4, the clutch KTR and the reverse brake BR are also here engaged. As a result, the transmission structures TA and TU are interconnected so as to form a drive unit and the input transmission structure TE in its standard arrangement is disposed in the power flow path ahead of the drive unit. In this way, the standard transmission arrangement again provides for a high transmission ratio and the engaged reverse brake BR provides for reverse rotation of the sun gears SA and SU, whose speed is again reduced in the output transmission structure TA providing for a reduced reverse speed of the output shaft.

FIG. 5: As indicated in the table of FIG. 6, the brakes B1 and BR as well as the clutch K3 are engaged so that the two transmission structures TA and TU are again interconnected to form a drive unit with a locked planetary gear carrier PTU. The input transmission structure in standard arrangement is disposed in the power path ahead of the drive unit. The standard arrangement of the transmission structure TE provides for a high transmission ratio whereas the effective reaction member PTU in the drive unit provides for reverse rotation of the coupled sun gears SA and SU, whose speed is again somewhat reduced in the output transmission structure for the output shaft A.

FIG. 7: As indicated in the table of FIG. 8, only the brakes B1 and BR are engaged. The function of the engaged state of the clutch 3 of FIG. 5 is again provided by the coupler shaft VUF so that the two transmission structures TA and TU are interconnected to a drive unit with a locked planetary gear carrier PTU serving as a reaction member. The input transmission structure in standard arrangement with locked sun gear SE is arranged in the power path ahead of the drive unit. The standard arrangement provides for a high transmission ratio. The engaged reverse brake BR provides for reverse rotation of the interconnected sun gears SA and SU whose speed is again reduced in the output gear structure TA for the output shaft A.

TRANSMISSION STATE REVERSE GEAR R2

FIG. 1: As indicated in the table of FIG. 2, the clutches K1, K3 and KTR as well as the reverse brake BR are engaged. As a result, the input transmission structure TE operates as a unit with the transmission ratio 1:1 with which the coupled drive formed by the other two transmission structures TA and TU is arranged in series. The planetary carrier PTU is locked and forms a reaction member arranged in the power path in series. The transmission ratio 1:1 provides for a lower speed and the engaged brake BR provides for the reverse rotation of the interconnected sun gears SA and SU whose speed is somewhat reduced in the output transmission structure TA for the output shaft A.

FIG. 3: As indicated by the table of FIG. 4, the clutches K1 and KTR as well as the brake BR are engaged whereas the coupling shaft VUF fulfills the function of the engaged clutch K3 of FIG. 1. As a result, the input transmission structure TE rotates as a unit with a transmission ratio 1:1. The coupled drive unit formed by the two other transmission structures TA and TU with the locked planetary gear carrier PTU forming a reaction member is arranged in the power path in series with the transmission structure TE. The partial transmission ratio of 1:1 provides for a low total transmission ratio. The engaged reverse brake BR changes the direction of rotation of the interconnected sun gears SA and SU whose speed is reduced in the output transmission structure TA for the output shaft A.

FIG. 5: As indicated in the table of FIG. 6, the clutches K1 and K3 as well as the reverse brake BR are engaged. The input transmission structure TE rotates as a unit with a transmission ratio 1:1. The two other transmission structures TA and TU form a coupled drive with locked planetary carrier PTU as reaction member and are arranged in the power path in series. The partial transmission ratio 1:1 provides for a small speed change. The engaged brake BR provides for reverse rotation of the sun gears SA and SU. The speed is reduced in the output transmission structure TA for the output shaft A.

FIG. 7: As indicated in the table of FIG. 8, the clutch K1 and the reverse brake BR are engaged. The function of the engaged clutch K3 of FIG. 5 is also here fulfilled by the interconnection VUF of the sun gears SA and SU. The input transmission structure TE operates as a unit with a partial transmission ratio of 1:1. The coupled drive with locked planetary gear carrier PTU forming a reaction member provided by the two other transmission structures TA and TU is arranged in the power path in series with the input transmission structure TE. The partial transmission ratio 1:1 does not provide for a speed change. The engaged brake BR reverses the direction of rotation of the interconnected sun gears SA and Su. The speed is reduced in the output transmission structure for the output shaft A.

TRANSMISSION STATE REVERSE GEAR R3:

FIG. 5: As indicated in the table of FIG. 6, the brakes BN and Br as well as the clutch K3 are engaged. As a result, the two transmission structures TA and TU are joined to form a drive unit with locked planetary gear carrier PTU and gear ring forming a reaction member. The input transmission structure TE is in a standard arrangement with locked gear ring NHE which forms a reaction member. This arrangement provides for the largest speed change of the three reverse stages R1 to R3, whereas the engaged brake BR provides for the reverse rotation of the interconnected sun gears SA and SU. The speed is further reduced in the output transmission structure TA for the output shaft A.

FIG. 7: As indicated in the table of FIG. 8 only the brakes BN and BR are engaged. The function of the engaged clutch K3 of FIG. 5 is performed by the coupler shaft VUF interconnecting the sun gears SA and SU. Consequently, the two transmission structures TA and TU form a drive unit with locked planetary carrier PTU. The input transmission structure TE in standard arrangement with the locked auxiliary gear ring NHE forming a reaction member is arranged in the power transmission path ahead of the drive unit. The locked auxiliary gear ring NHE causes a very high speed change—the highest of the three reverse gears—whereas the locked planetary gear carrier PTU provides for the reverse rotation of the interconnected sun gears SA and SU. The speed is further reduced in the output transmission TA for the output shaft A.

Throughout the description, reference was made to gears to indicate the rotary motion transmission members of the various transmission structures. It is pointed out however that the gears could be replaced for example by friction or traction rollers.

What is claimed is:

1. A planetary speed change transmission including an input shaft and an output shaft and first, second and third planetary transmission structures disposed between said input and output shafts so as to transmit motion from said input shaft to said output shaft at different transmission ratios, said first planetary transmission structure comprising a first planetary gear carrier, first planetary gears rotatably supported on said first planetary gear carrier, a first gear ring surrounding and engaging said first planetary gears and being connected to said input shaft for rotation therewith, a first sun gear disposed centrally within the arrangement of said first planetary gears and being in engagement therewith, said first sun gear being connected to a disengageable first braking structure for rotationally locking said first sun gear and also to a disengageable first clutch for providing a block connection with said first planetary gear carrier, said second planetary transmission structure including a second planetary gear carrier having second planetary gears rotatably supported thereon and being firmly connected to said output shaft, a second gear ring extending around, and engaging, said second planetary gears and being connected to said input shaft by way of a disengageable second clutch, a second sun gear disposed within, and in engagement with, the arrangement of said second planetary output transmission gears, and being connected to a disengageable second braking structures, said third planetary gear transmission structure including a third planetary gear carrier, an array of third planetary gears rotatably supported on said third planetary gear carrier, said third planetary gear carrier being firmly connected to said second gear ring for rotation therewith and also to a third braking structure which is engageable for reversing the direction of rotation of said output shaft, a third gear ring extending around, and engaging, said third planetary gears, and further having a drive connection with said first planetary gear carrier, a third sun gear disposed within, an in engagement with said array of third planetary gears and having a drive connection to said second sun gear, said first planetary gear carrier rotatably supporting auxiliary planetary gears disposed around, and in engagement with, said first planetary gears, and an auxiliary gear ring extending around, and in engagement with, said auxiliary planetary gears, a fourth braking structure connected to said auxiliary gear ring for selectively locking said auxiliary gear ring, wherein, for a transmission ratio other than 1, only the fourth braking structure and the second clutch which interconnects the input shaft and the second ring gear are engaged thereby providing a seventh forward gear.

2. A planetary speed change transmission according to claim 1, wherein, in a low speed forward speed range (1.gear) with a transmission ratio other than 1 exclusively the fourth braking structure and the second braking structure are engaged.

3. A planetary speed change transmission according to claim 1, wherein, for reverse operation, exclusively said fourth braking structure and said third braking structure are engaged.

4. A planetary speed change transmission according to claim 1, herein said second and third sun gears are firmly interconnected.

5. A planetary speed change transmission according to claim 1, wherein a free wheeling clutch is arranged between the first planetary gear carrier and a stationary part of the transmission such that the freewheeling clutch engages when a torque is effective on said planetary gear carrier which is opposite to the torque transmitted by said input shaft.

6. A planetary speed change transmission according to claim 1, wherein in the intermediate forward speed range (3rd gear), in which said fourth braking structure is disengaged, the first clutch is engaged.

* * * * *